United States Patent
Wu et al.

(10) Patent No.: US 8,753,040 B2
(45) Date of Patent: Jun. 17, 2014

(54) OFFSHORE INSTALLATION METHOD OF A WIND POWER GENERATOR AND ITS FABRICATION SEGMENTS

(71) Applicant: Ship and Ocean Industries R&D Center, New Taipei (TW)

(72) Inventors: Chao-Cheng Wu, New Taipei (TW); Po-Feng Lin, New Taipei (TW); Che-Yuan Liu, New Taipei (TW)

(73) Assignee: Ship and Ocean Industries R&D Center, New Taipei (TW)

( * ) Notice: Subject to any disclaimer, the term of this patent is extended or adjusted under 35 U.S.C. 154(b) by 0 days.

(21) Appl. No.: 13/676,680

(22) Filed: Nov. 14, 2012

(65) Prior Publication Data

US 2014/0133921 A1    May 15, 2014

(51) Int. Cl.
*E02D 23/08*    (2006.01)
(52) U.S. Cl.
USPC ............................. 405/206; 405/204; 405/207
(58) Field of Classification Search
USPC ....................... 405/195.1, 203, 204, 205, 207
See application file for complete search history.

(56) References Cited

U.S. PATENT DOCUMENTS

| | | | |
|---|---|---|---|
| 7,905,677 B1* | 3/2011 | Erickson | 403/379.3 |
| 8,240,955 B2* | 8/2012 | Nies | 405/204 |
| 2007/0102940 A1* | 5/2007 | Hansen | 290/55 |
| 2009/0044482 A1* | 2/2009 | Tooman | 52/699 |
| 2009/0087311 A1* | 4/2009 | Wyborn | 416/9 |
| 2009/0211174 A1* | 8/2009 | Henderson et al. | 52/40 |
| 2010/0314884 A1* | 12/2010 | Ollgaard et al. | 290/55 |
| 2010/0316450 A1* | 12/2010 | Botwright | 405/206 |
| 2011/0041438 A1* | 2/2011 | Frost | 52/296 |
| 2011/0305523 A1* | 12/2011 | Karal et al. | 405/207 |
| 2012/0189390 A1* | 7/2012 | Belinsky et al. | 405/204 |
| 2012/0255478 A1* | 10/2012 | Hadeler et al. | 114/61.31 |
| 2012/0266796 A1* | 10/2012 | Roodenburg et al. | 114/61.14 |
| 2013/0115054 A1* | 5/2013 | Yokoyama et al. | 415/126 |

* cited by examiner

*Primary Examiner* — Thomas B Will
*Assistant Examiner* — Jessica H Lutz
(74) *Attorney, Agent, or Firm* — Ming Chow; Sinorica, LLC

(57) ABSTRACT

The invention relates to an offshore installation method of a wind power generator and its fabrication segments. A prefabricated wind power generator is finished at a first location, and then carried by a ship to a second location for installation, largely saving installation time. With a tower inserted down through a base to shrink height of the generator, the ship can not only effectively diminish shaking posed by wind and sea waves, advancing steadiness of delivery, but also be one with smaller tonnage to save cost.

2 Claims, 19 Drawing Sheets

OFFSHORE INSTALLATION METHOD OF A WIND POWER GENERATOR AND ITS FABRICATION SEGMENTS

BACKGROUND OF THE INVENTION

1. Field of the Invention

This invention relates to a method of installing a wind power generator with particular fabrication segments, particularly to one employed to execute installation offshore.

2. Description of the Prior Art

So far, wind electricity has been undoubtedly acknowledged as the most possible alternative energy to replace fossil fuel, as it utilizes wind power as an endless resource, creates no waste, and has a low cost of building and installation. As for locations of wind power generators, owing to wind averagely blows a longer period, a higher speed, with no shelter, and more stably over sea than over land, and generators installed offshore affect the environment and the landscape much less than on land, installing wind power generators offshore is thus a main stream.

In order to prevent installation from being interrupted by marine weather shifting swiftly and unpredictably, a conventional installation is first to fabricate a wind power generator offshore, and next the integrally assembled generator is lifted up by a barge and carried to an installation location. Finally the integrally assembled generator is lowered down and positioned on the installation location, finishing the installation.

However, as the integrally assembled generator stands rather high, it is apt to sway while being delivered by even a large barge shaken by wind waves, posing an unsteady delivery ever complained.

SUMMARY OF THE INVENTION

The object of this invention is to offer an offshore installation method of a wind power generator and its fabrication segments. It is not only to shorten installation time of the wind power generator, but also to enable a ship carrying the wind power generator to diminish shaking and augment steadiness of delivery.

The fabrication segments of the wind power generator include a base, a connecting member, a tower, a nacelle and a blade wheel. The base is provided with a central hole and a first connecting portion. The connecting member is provided with a second connecting portion located at one side to correspondingly combine with the first connecting portion, and a first joint portion located at another side. The tower is provided with a second joint portion formed at one side to correspondingly combine with the first joint portion. The nacelle is fixed on the tower. The blade wheel is fixed with the nacelle.

A preferred embodiment of an offshore installation method of a wind power generator is executed at a shallow water region, including three stages of prefabrication, removal and installation. The stage of prefabrication is installing the base at a first location; directly inserting the tower through the central hole of the base, finally assembling the nacelle on the tower and assembling the blade wheel with the nacelle to form a prefabricated wind power generator. The stage of removal is taking advantage of a ship to lift the prefabricated wind power generator and carry it to a second location. The stage of installation is furnishing the ship with ballast to enable the ship to land on a seabed, lowering the base to be fixedly positioned on the second location, pulling up the tower out of the central hole, making the second connecting portion of the connecting member combined with the first connecting portion of the base, finally making the second joint portion of the tower combined with the first joint portion of the connecting member to finish installation of the wind power generator.

Another preferred embodiment of the offshore installation method of a wind power generator is executed at a deep water region, including three stages of prefabrication, removal and installation. The stage of prefabrication is, installing the base at a first location, directly inserting the tower through the central hole of the base, finally assembling the nacelle on the tower and assembling the blade wheel with the nacelle to form a prefabricated wind power generator. The stage of removal is taking advantage of a ship to lift the prefabricated wind power generator and carry it to a second location.

The stage of installation is, furnishing the ship with ballast to make the ship stay steadily; lowering the base to be fixedly positioned on the second location, pulling up the tower out of the central hole; making the second connecting portion of the connecting member combined with the first connecting portion of the base, depositing buffers on the first joint portion of the connecting member, finally making the second joint portion of the tower pressed on the buffers and positioning bars inserted into positioning holes of the tower, so as to enable the second joint portion to slowly approach and to be combined with the first joint portion to finish installation of the wind power generator.

With the prefabricated wind power generator assembled at the first location and delivered to the second location by the ship for installation, a great deal of time can be saved for installing the wind power generator. Furthermore, with the tower inserted through the central hole of the base to lower height of the prefabricated wind power generator, even a smaller ship can diminish shaking posed by wind and sea waves, not only achieving steady delivery, but also saving cost.

BRIEF DESCRIPTION OF DRAWINGS

This invention is better understood by referring to the accompanying drawings, wherein.

DETAILED DESCRIPTION OF THE PREFERRED EMBODIMENT

Figure 1:
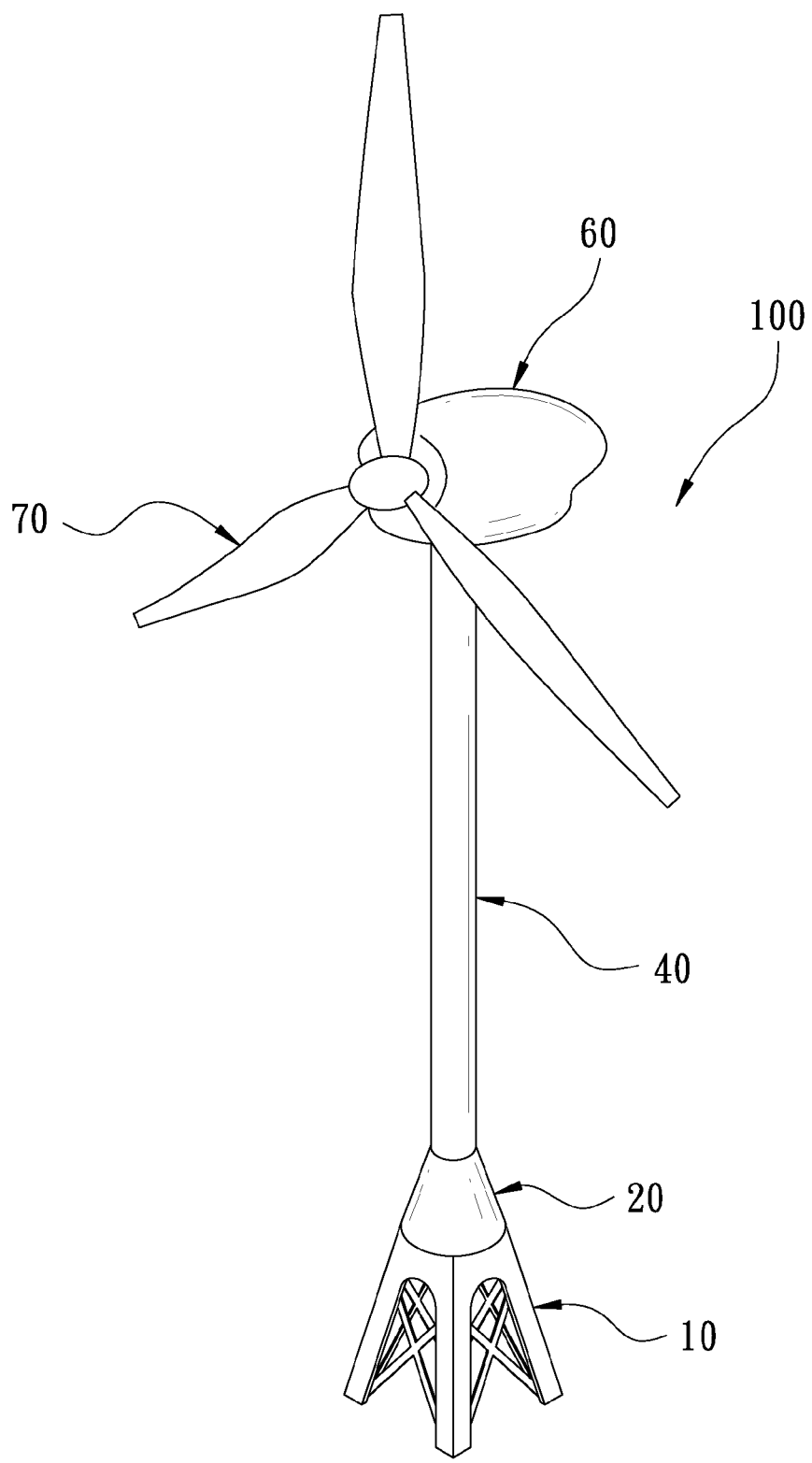
FIG. 1 is a perspective view of a first preferred embodiment of an offshore installation method of a wind power generator and its fabrication segments in the present invention.
Figure 2:
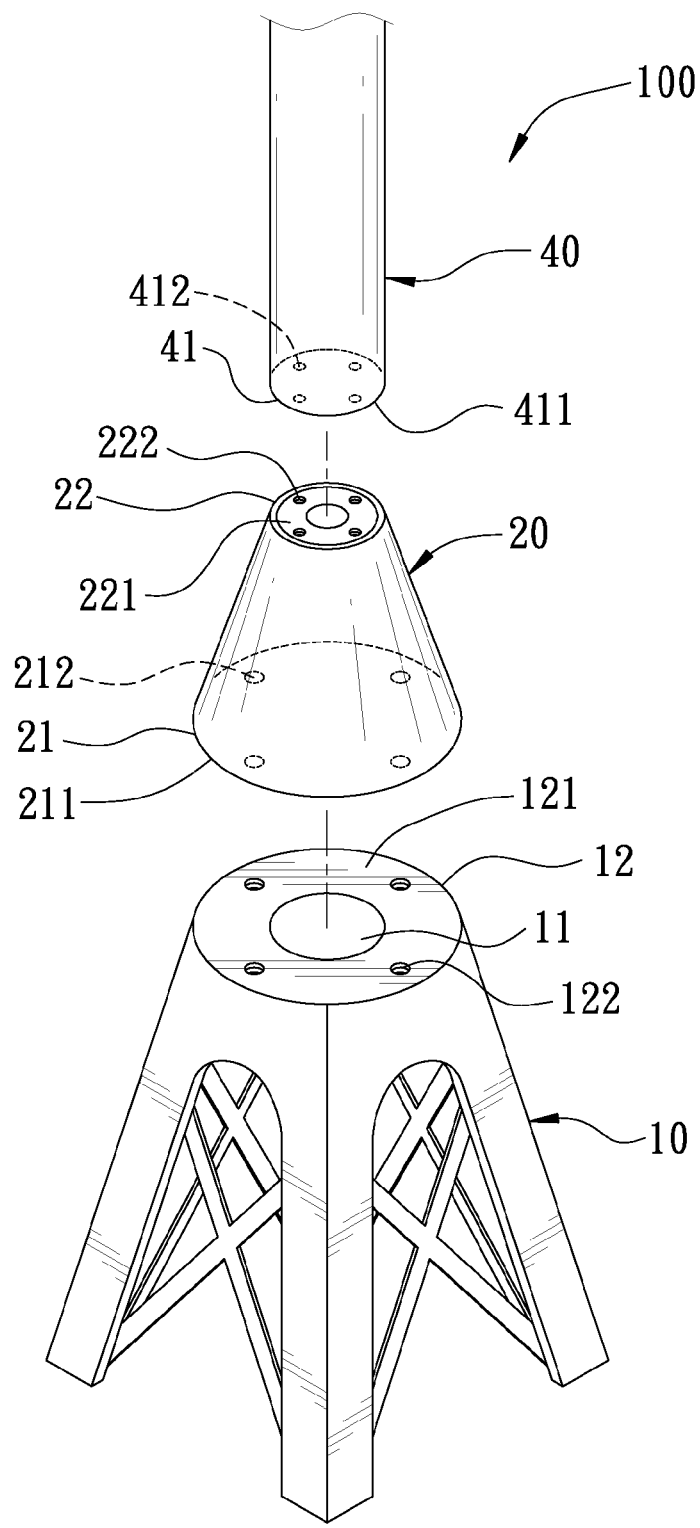
FIG. 2 is a partial exploded perspective view of the first preferred embodiment of the present invention.
Figure 3:
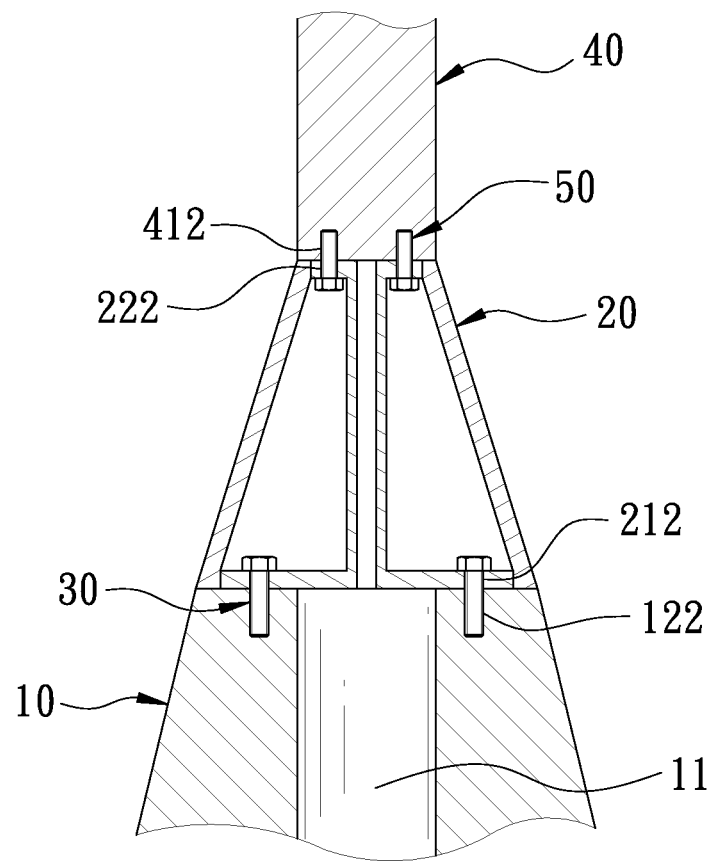
FIG. 3 is a partial cross-sectional view of the first preferred embodiment of the present invention.
Figure 4:
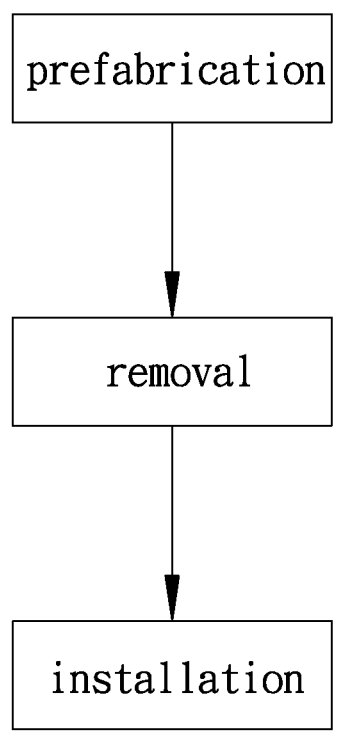
FIG. 4 is a block flow chart of the first preferred embodiment of the present invention, showing installation stages.

As shown in FIGS. 1~3, a first preferred embodiment of fabrication segments of a wind power generator 100 in this present invention includes a base 10, a connecting member 20, a tower 40, a nacelle 60 and a blade wheel 70.

The base 10 is provided with a central hole 11 and a first connecting portion 12. In this embodiment, the first connecting portion 12 is designed as a flange 121 provided with plural first through holes 122.

The connecting member 20 is provided with a second connecting portion 21 located at one side to correspond to the first connecting portion 12 of the base 10. In this embodiment, the second connecting portion 21 is also designed as a flange 211 provided with plural second through holes 212 to correspond to the first through holes 122 respectively. Plural first bolts 30 are employed to fix the first through holes 122 with the second through holes 212, making the first connecting portion 12 fixedly combined with the second connecting portion 21. The connecting member 20 is further provided with a first joint portion 22 located at another side and designed as a flange 221 in this embodiment, with plural first holes 222.

The tower 40 is provided with a second joint portion 41 used to correspondingly combine with the first joint portion 22. In this embodiment, the second joint portion 41 is also designed as a flange 411 provided with plural second holes 412 to correspond to the first holes 222 respectively. Plural second bolts 50 are employed to fix the first holes 222 with the second holes 412, making the first joint portion 22 fixedly combined with the second joint portion 41.

The nacelle 60 is fixed on the tower 40.

The blade wheel 70 is fixed with the nacelle 60.

Next, FIGS. 4~12 show a first preferred embodiment of an offshore installation method of a wind power generator 100 in the present invention. The method is executed at a shallow water region with a depth less than 30 meters, including three stages described as follows.

Stage (A) of prefabrication: The base 10 is first positioned at a first location, with the tower 40 directly inserted through the central hole 11. Next the nacelle 60 is fixed on the tower 40 and the blade wheel 70 is fixed with the nacelle 60 consecutively. The wind power generator assembled so far is defined as a prefabricated wind power generator 100'. The first location is selected at seashore.

Stage (B) of removal: The prefabricated wind power generator 100' is lifted up by a ship 200 and carried to a second location spaced apart from the first location with a rather long distance.

Stage (C) of Installation: When the ship 200 arrives the second location, it is increasingly furnished with more ballast to land on a seabed 300. Then, the base 10 is descended to be positioned on the second location, with the tower 40 lifted out of the central hole 11 of the base 10. Next the connecting member 20 has the second connecting portion 21 bolted with the first connecting portion 12 of the base 10, and the tower 40 has the second joint portion 41 bolted with the first joint portion 22 of the connecting member 20. Thus installation of the wind power generator 100 is finished.

Figure 5:
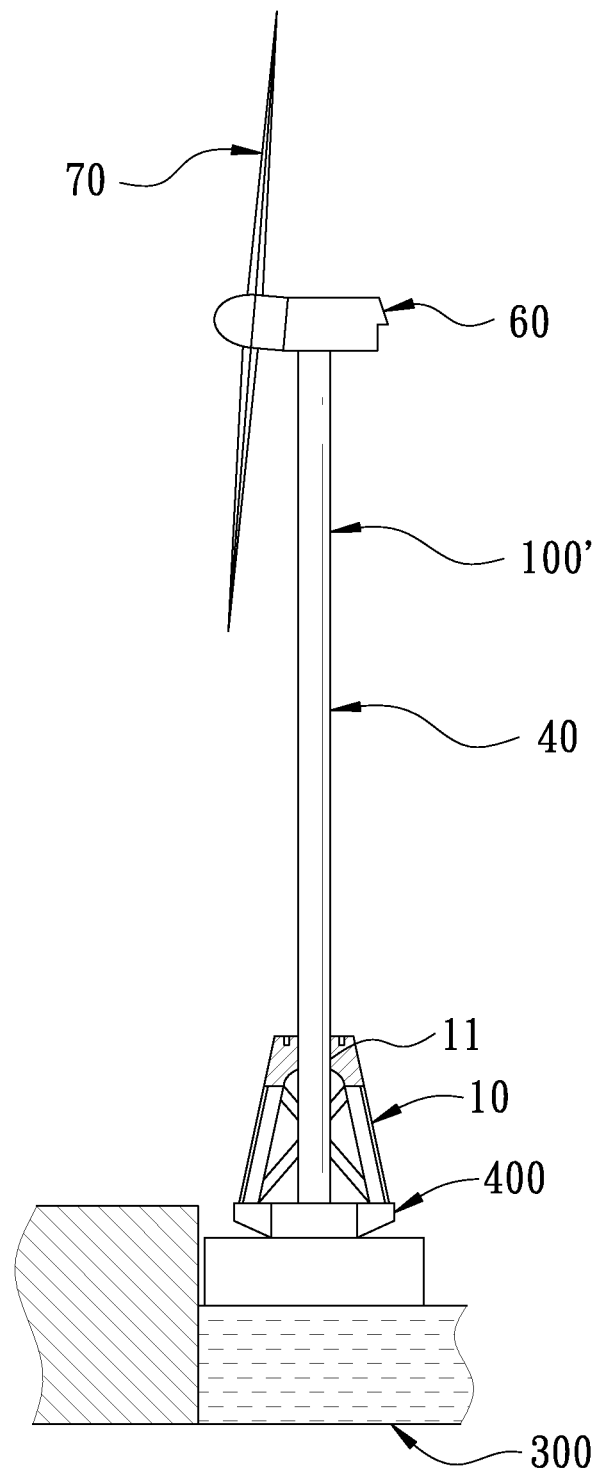
FIG. 5 is a side view of the first preferred embodiment of the present invention, showing a prefabricated wind power generator being finished at a first location.

As shown in FIG. 5. a platform 400 can be made at the first location, utilized to assemble the prefabricated wind power generator 100' by the way described previously. That is, the base 10 is first positioned at a first location, with the tower 40 directly inserted through the central hole 11; next the nacelle 60 is fixed on the tower 40 and the blade wheel 70 is fixed with the blade wheel 60 consecutively.

Figure 6:
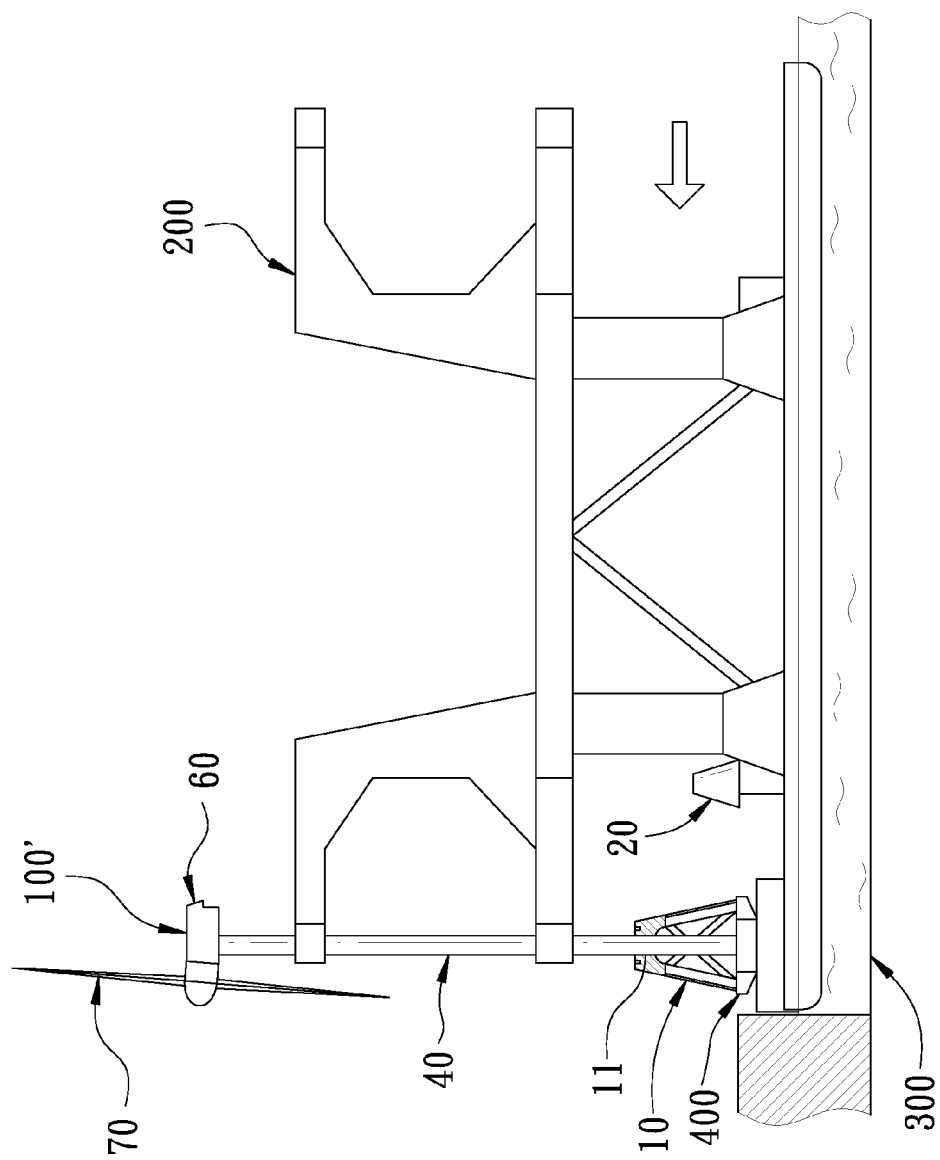
FIG. 6 is a side view of the first preferred embodiment of the present invention, showing a ship being moved to a platform.
Figure 7:
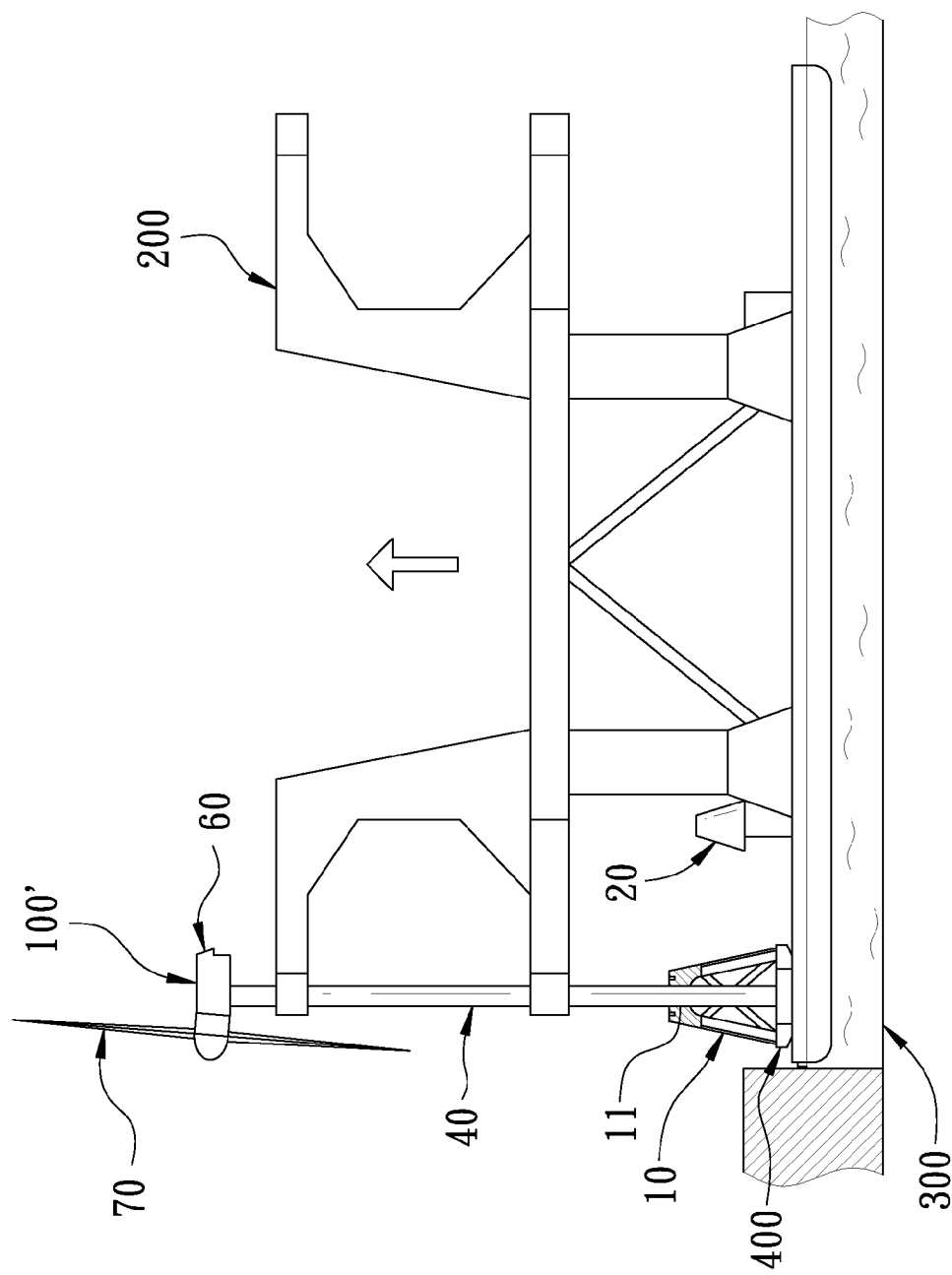
FIG. 7 is a side view of the first preferred embodiment of the present invention, showing the prefabricated wind power generator being lifted by the ship.
Figure 8:
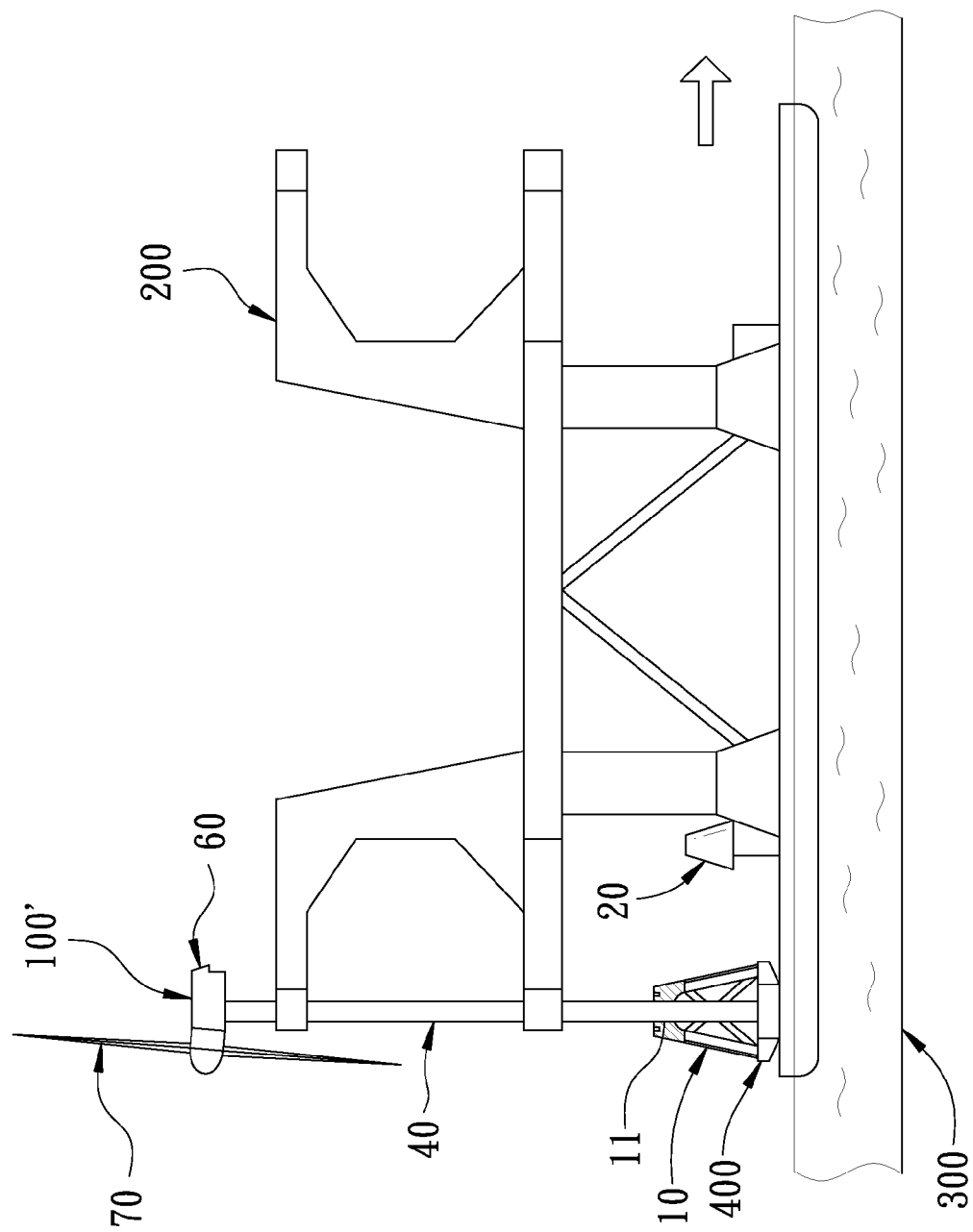
FIG. 8 is a side view of the first preferred embodiment of the present invention, showing the prefabricated wind power generator being shipped by the ship to a second location.

Next, the ship 200 is moved to the platform 400 on the ebb, as shown in FIG. 6, so that the platform 400 and the prefabricated wind power generator 100' on it can be raised naturally by flood, with the prefabricated wind power generator 100' conveniently loaded on the ship 200, as shown in FIG. 7. Then the prefabricated wind power generator 100' can be shipped by the ship to the second location, as shown in FIG. 8.

Figure 9:
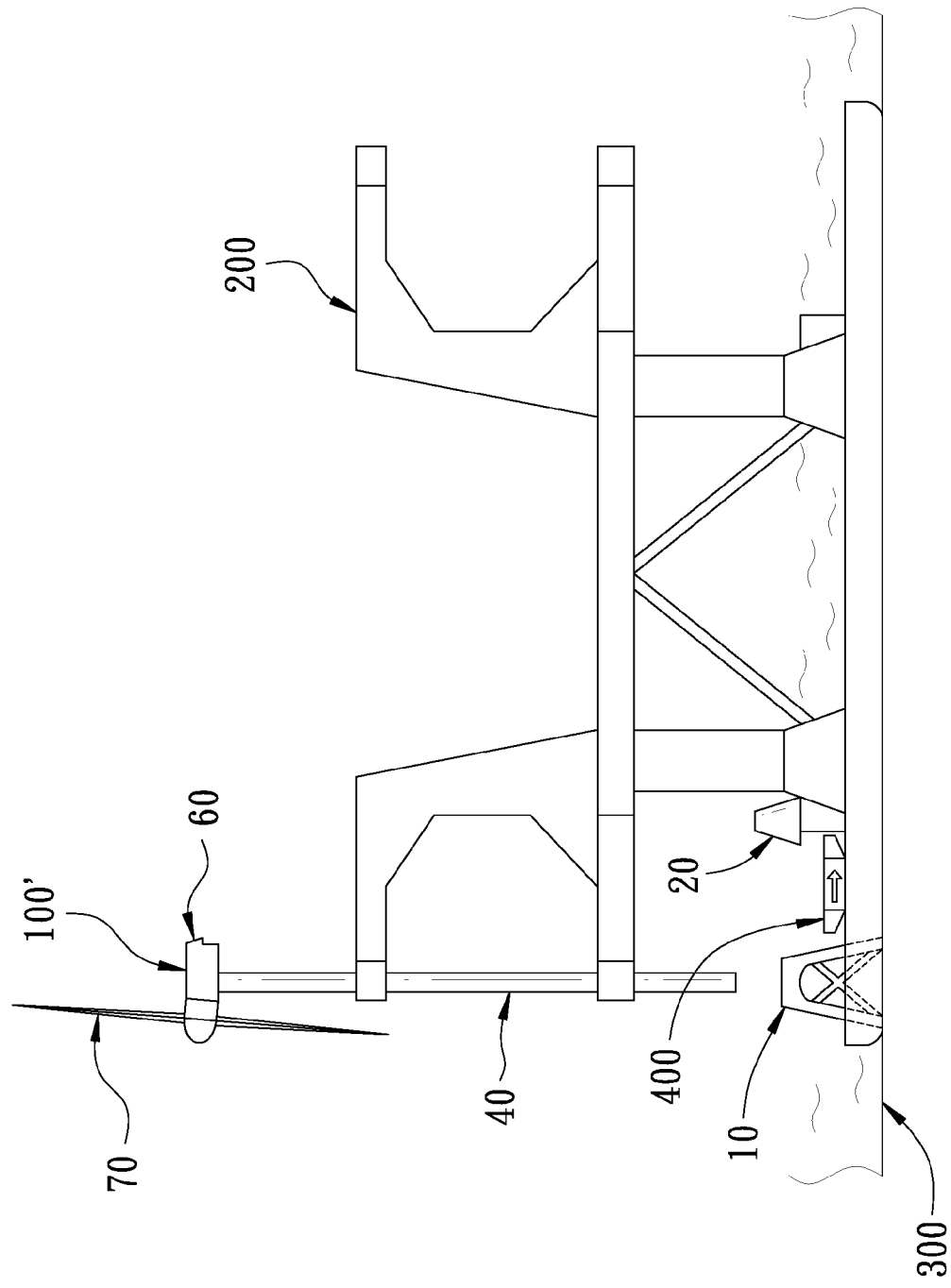
FIG. 9 is a side view of the first preferred embodiment of the present invention, showing the ship being furnished with ballast.
Figure 10:
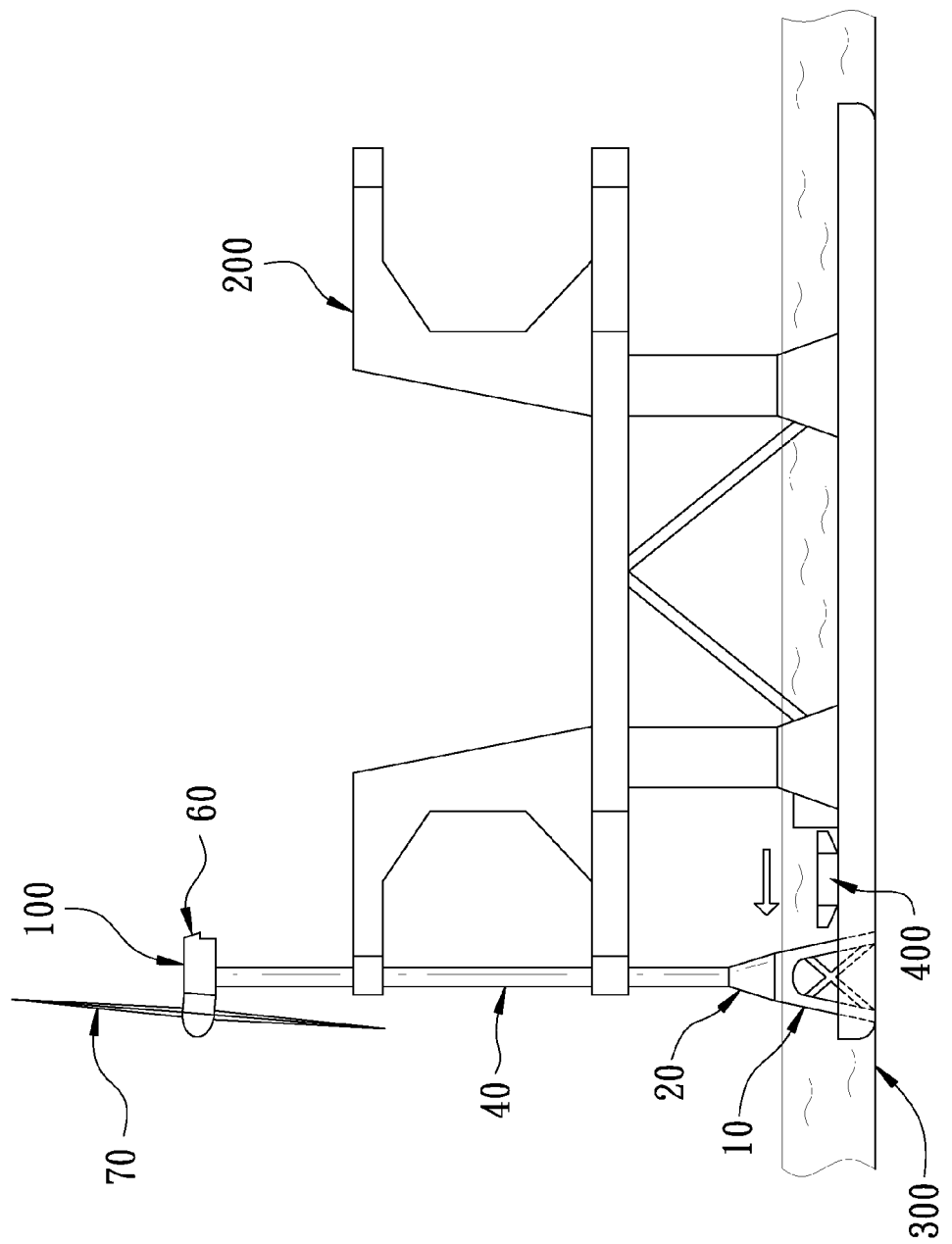
FIG. 10 is a side view of the first preferred embodiment of the present invention, showing the wind power generator being completely assembled.

As shown in FIGS. 9 and 10, as the ship 200 arrives the second location, it can be loaded with ballast to land on the seabed 300, steadily positioned at the second location to avoid from being affected by the sea waves, stepping up security of operation. Next the platform 400 can be removed away, and the base 10 can be lowered and fixed on the second location. The tower is successively pulled out of the central hole 11 of the base 10, with an interval formed between the base 10 and the tower 40 for workers to assemble the connecting member 20 on the base 10. By the time, the tower 40 can be assembled on the connecting member 20, finishing fabrication of the wind power generator 100.

Figure 11:
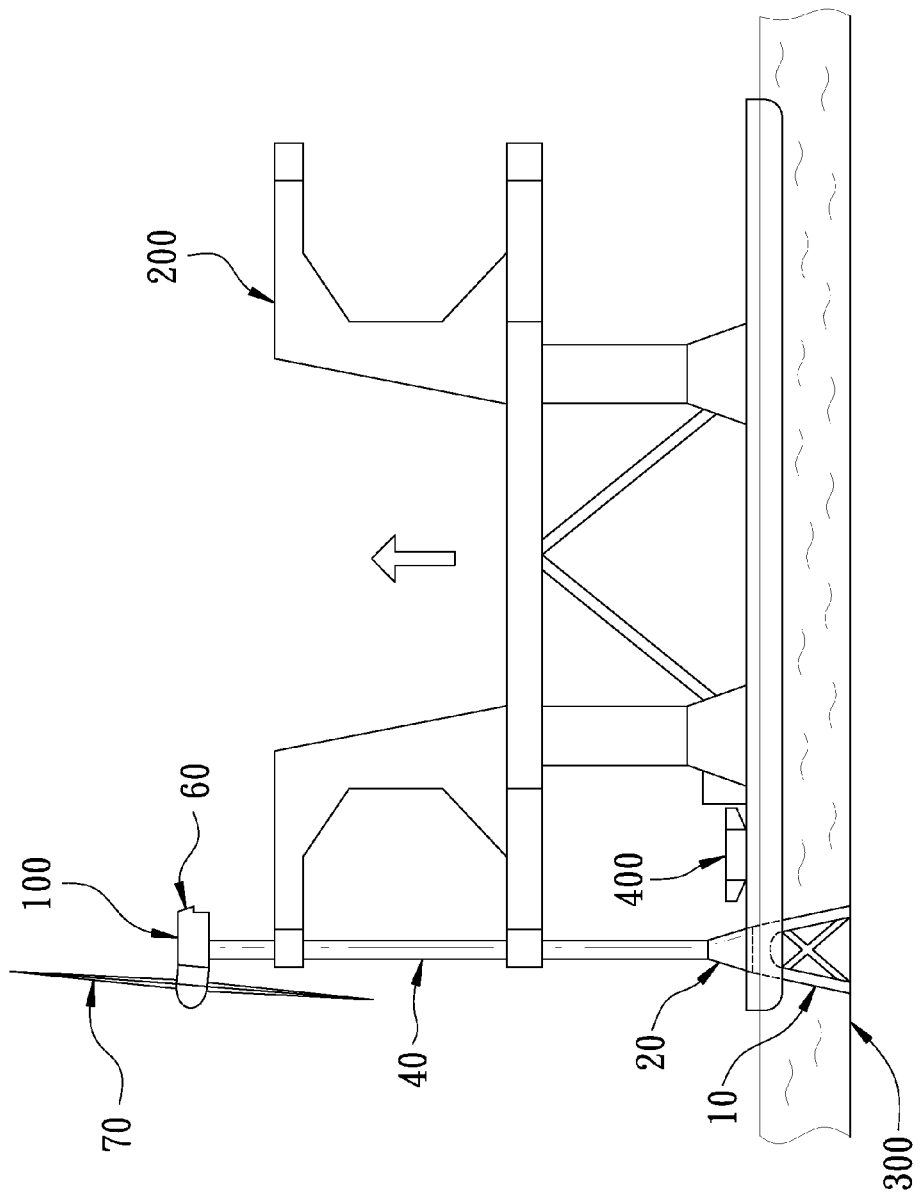
FIG. 11 is a side view of the first preferred embodiment of the present invention, showing the ballast being released off the ship.
Figure 12:
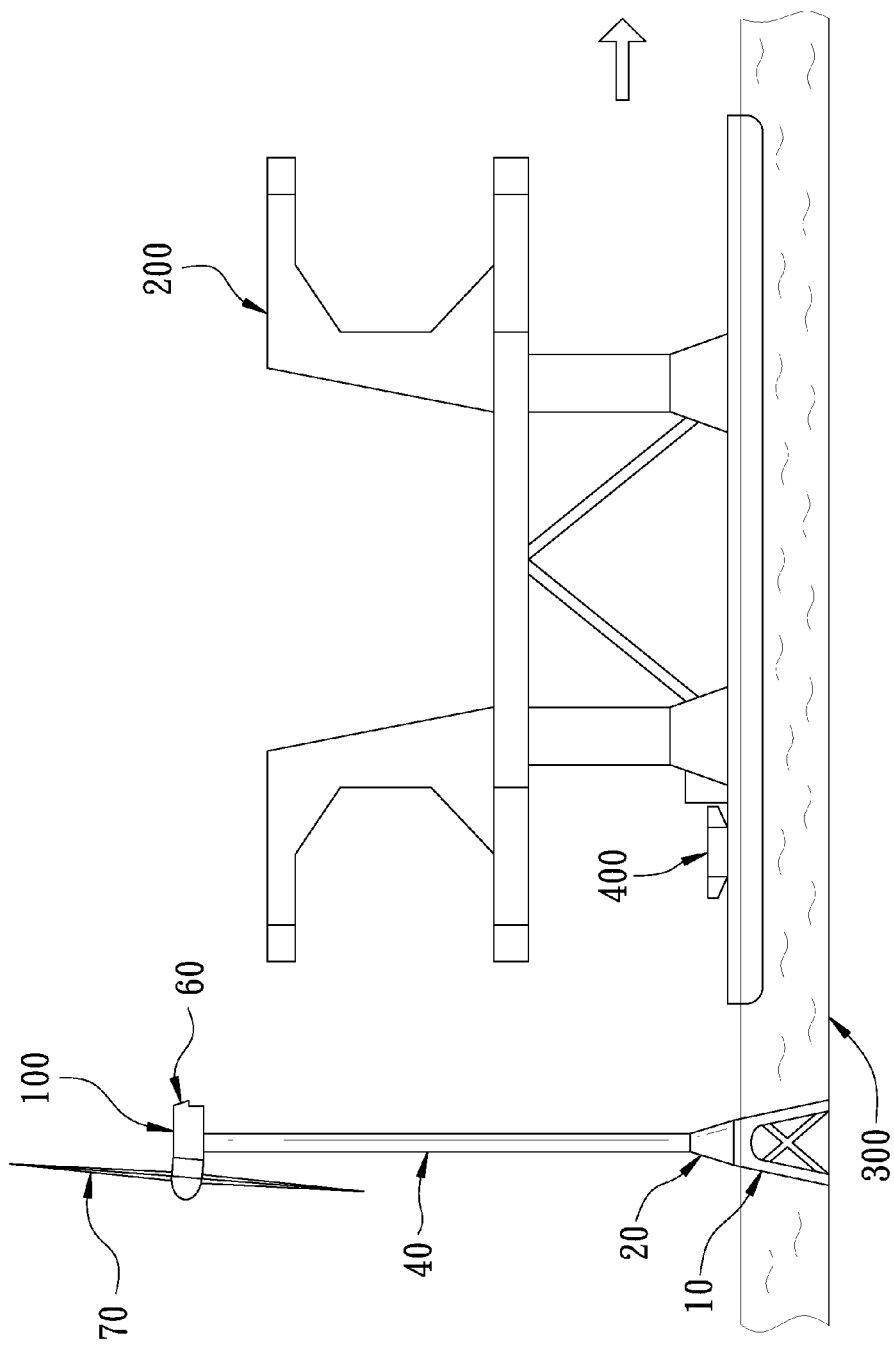
FIG. 12 is a side view of the first preferred embodiment of the present invention, showing the ship sailing away the wind power generator.

Finally, as shown in FIG. 11, the ballast of the ship 200 can be released off to enable the ship 200 to rise leaving the seabed 300. So can the ship 200 move away, finishing installation of the wind power generator 100, as shown in FIG. 12.

The advantages of the invention are described as can be seen from the foresaid description. The prefabricated wind power generator 100' is finished at the first location and delivered to the second location by the ship 200 for a final assembly, able to largely lessen time of installing the prefabricated wind power generator 100. Furthermore, as the tower 40 is inserted through the central hole 11 while being delivered, the height of the wind power generator 100 can be greatly shrunk to diminish shaking posed by the wind and sea waves, not only augmenting shipping steadiness, but also saving cost as the ship 200 can be one with a smaller tonnage.

Figure 13:
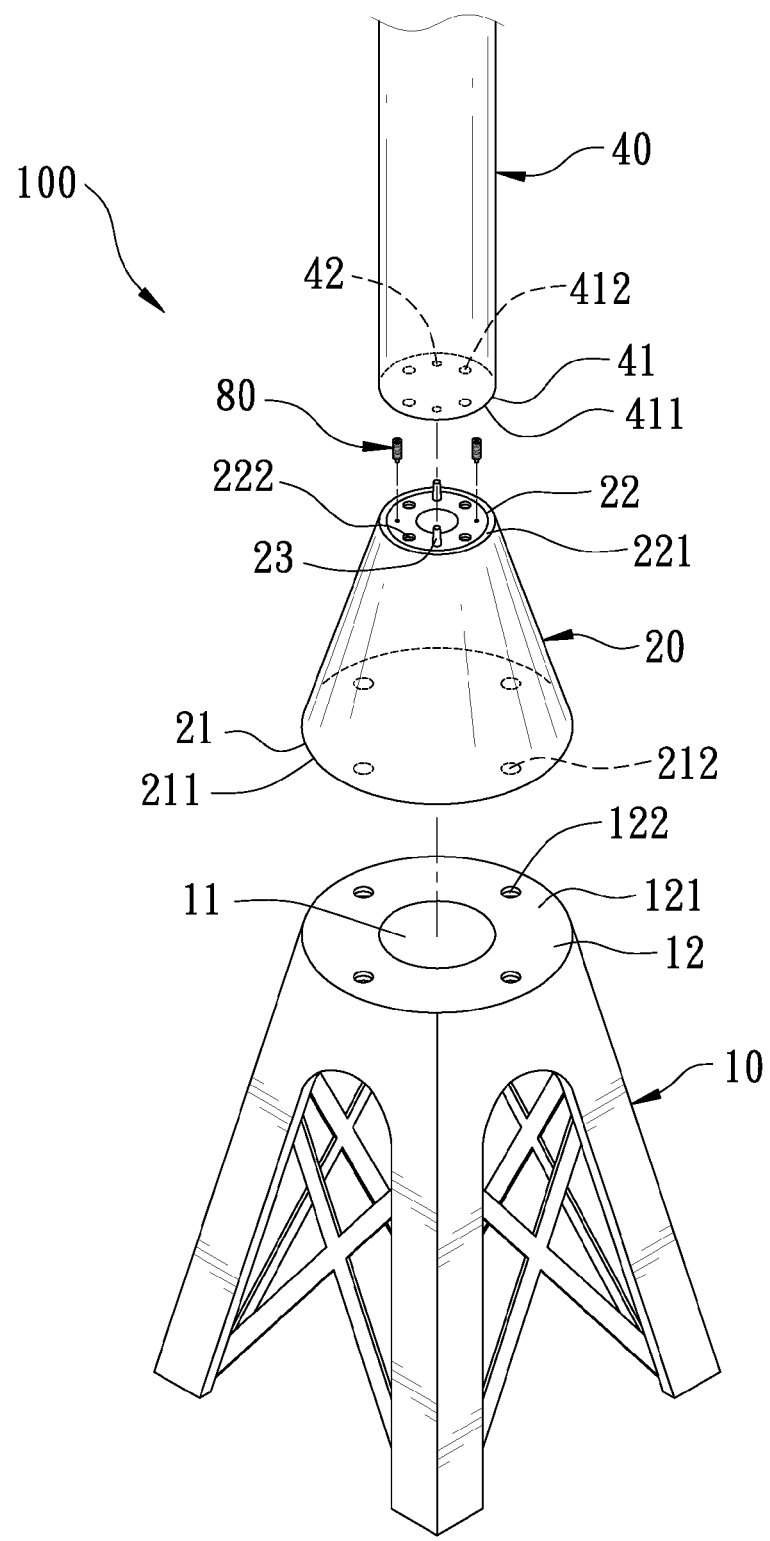
FIG. 13 is a partial exploded perspective view of a second preferred embodiment of an offshore installation method of a wind power generator and its fabrication segments in the present invention.
Figure 14:
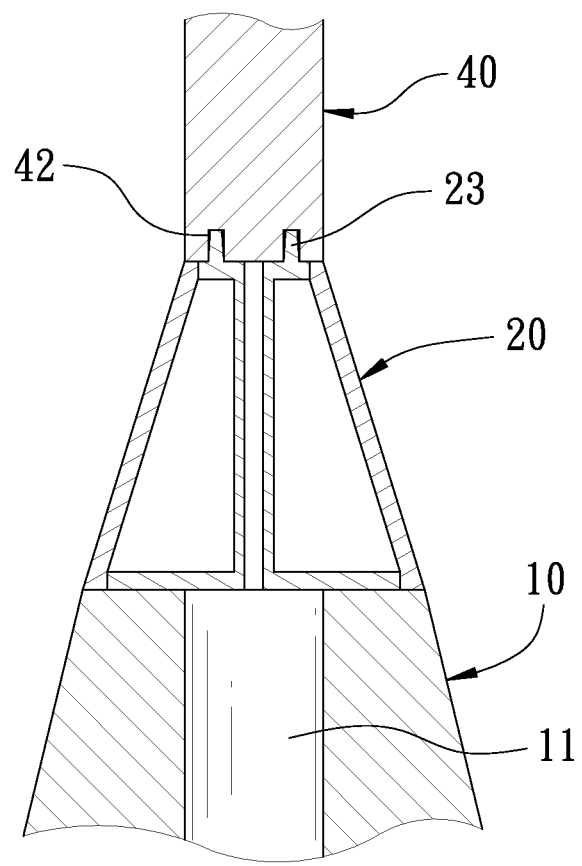
FIG. 14 is a partial cross-sectional view of the second preferred embodiment of the present invention.
Figure 15:
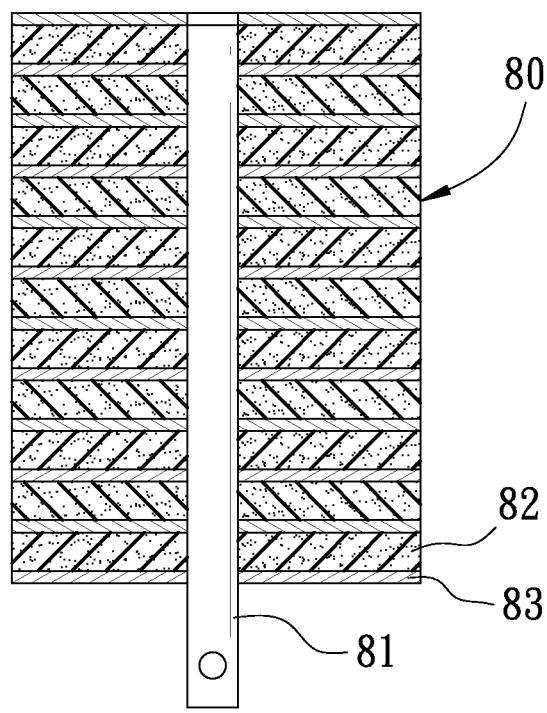
FIG. 15 is a cross-sectional view of a buffer in the second preferred embodiment of the present invention.

As shown in FIGS. 13~15, a second preferred embodiment of fabrication segments of a wind power generator 100 in this present invention has the same components as the first one does, except some differences mentioned below. The connecting member 20 is further provided with at least a positioning bar 23 correspondingly inserted in a positioning hole 42 further provided in the tower 40. In this embodiment, two positioning bars 23 are built on the first joint portion 22 of the connecting member 20 and two positioning holes 42 are bored on the second joint portion 41 of the tower 40. Moreover, the wind power generator 100 is further provided with plural buffers 80 laid between the first joint portion 22 and the second joint portion 41. And, as shown in FIG. 15, each of the buffers 80 is provided with a brace 81 alternately stacked with plural rubber sheets 82 and plural steel sheets 83.

Figure 16:
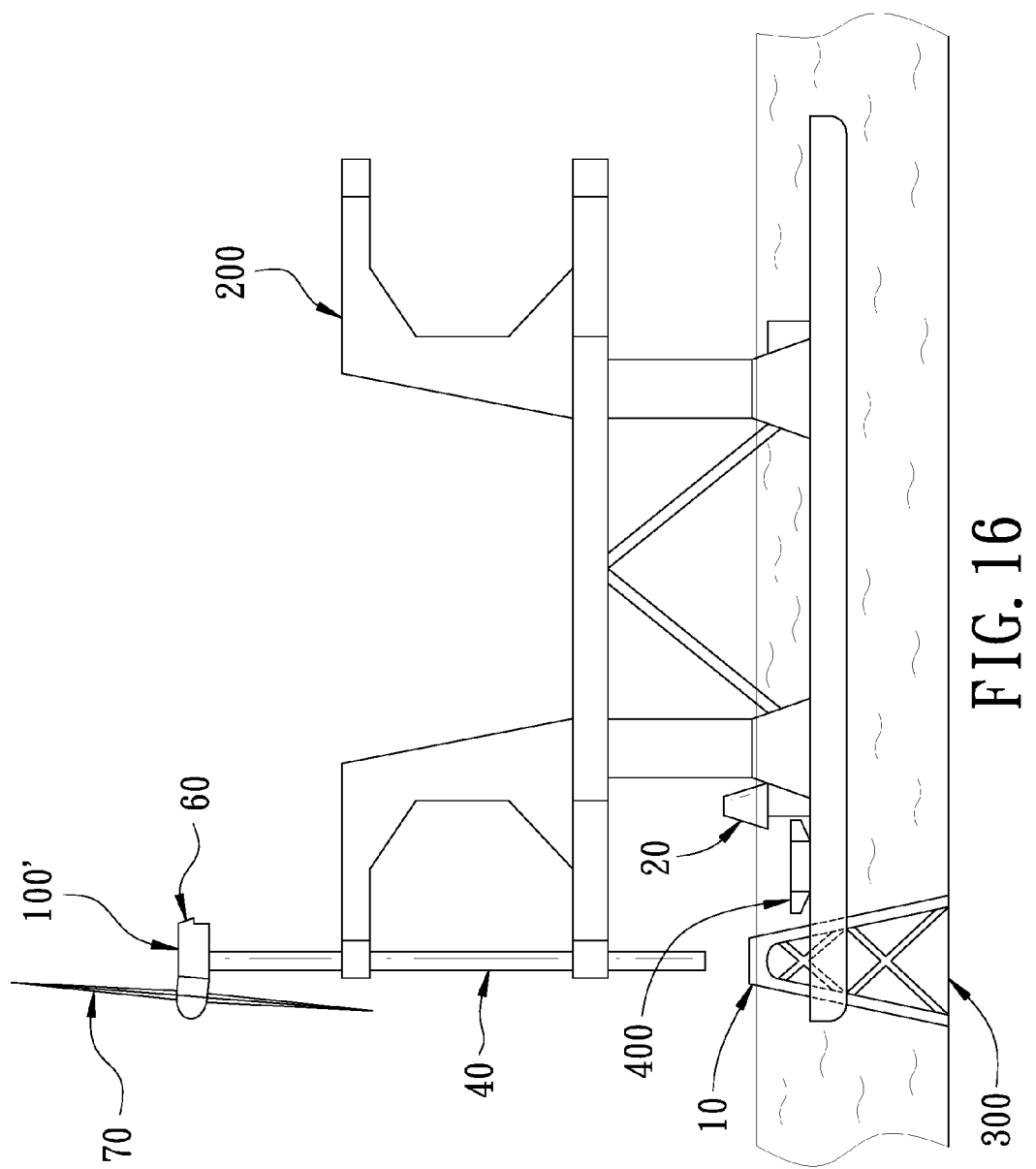
FIG. 16 is a side view of the second preferred embodiment of the present invention, showing the base being descended.
Figure 17:
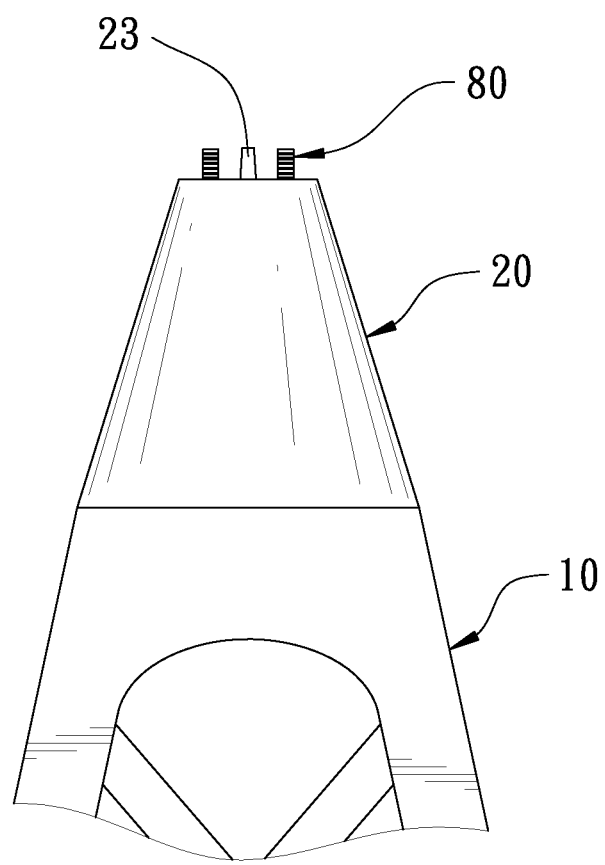
FIG. 17 is a side view of the second preferred embodiment of the present invention, showing buffers being deposited on a connecting member.
Figure 18:
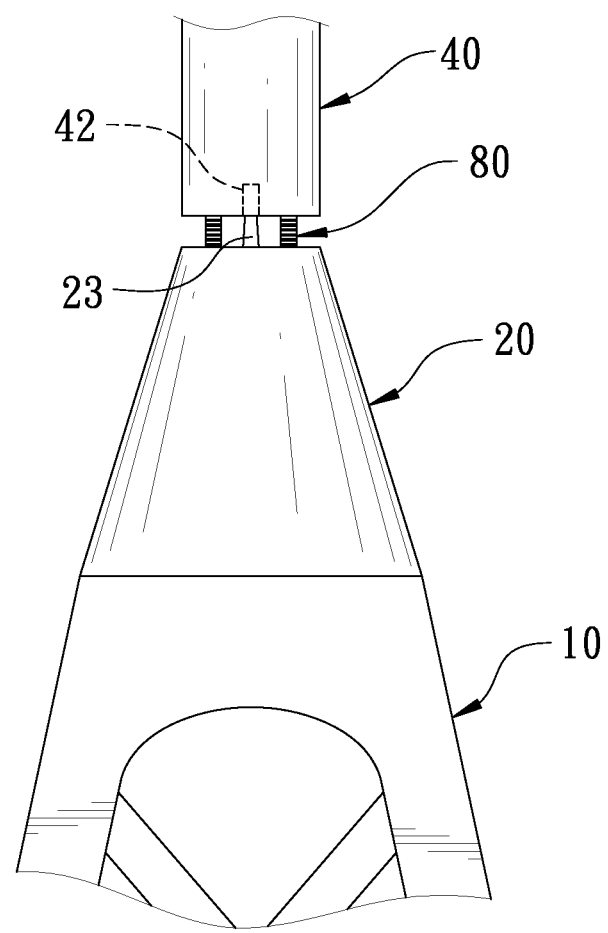
FIG. 18 is a side view of the second preferred embodiment of the present invention, showing fabrication of a tower.
Figure 19:
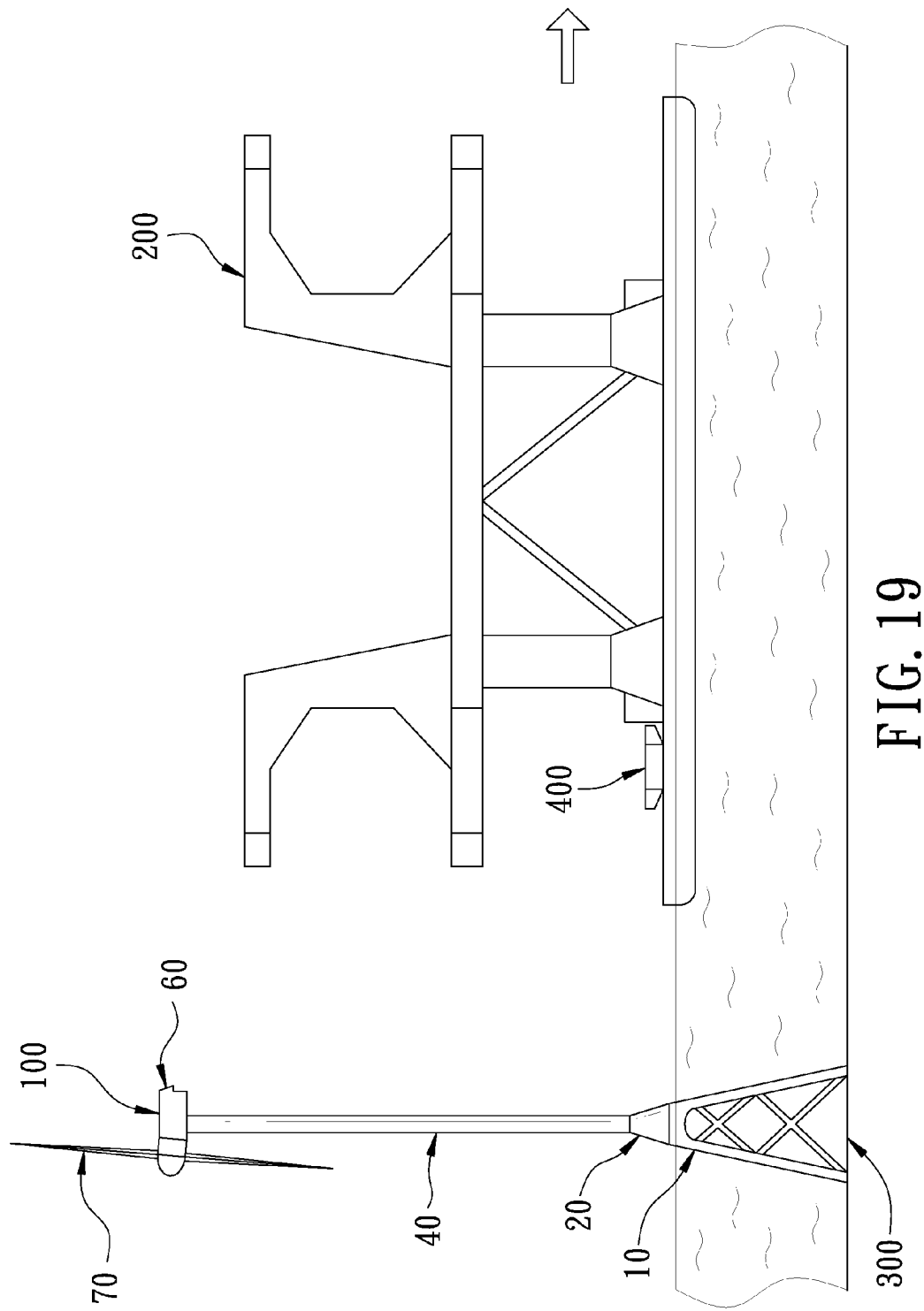
FIG. 19 is a side view of the second preferred embodiment of the present invention, showing the ship sailing away the wind power generator.

FIGS. 16~19 show a second preferred embodiment of an offshore installation method of a wind power generator 100 in the present invention. The method is executed at a deep water region with a depth more than 30 meters, having following differences from the first embodiment. As shown in FIG. 16, the ship 200 is furnished with more ballast to stay steadily; the base 10 is descended and positioned at the second location, with the tower 40 lifted out of the central hole 11 of the base 10, making an interval formed between the base 10 and the tower 40. Then the connecting member 20 concurrently laid on the ship 200 is assembled on the first connecting portion 12 of the base 10, with the buffers 80 deposited on the first joint portion 22, as shown in FIG. 17. Next, as shown in FIG. 18, the second joint portion 41 of the tower 40 is lowered to press on the buffers 80, with the positioning bars 23 of the connecting member 20 fitting into the positioning holes 42 of the tower 40, enabling the second joint portion 41 to slowly approach the first joint portion 22 to finish assembly of the wind power generator 100. Finally, as shown in FIG. 19, the ship 200 can release off the ballast and sail away, finishing installation of the wind power generator 100.

Therefore the second embodiment can not only achieve the advantages of the first embodiment, a steady delivery and saving cost, but also prevent collision between the tower 40 and the connecting member 20, further reinforcing stability and security.

While the preferred embodiment of the invention has been described above, it will be recognized and understood that various modifications may be made therein and the appended claims are intended to cover all such modifications that may fall within the spirit and scope of the invention.

What is claimed is:

1. A method of installing a wind power generator at a shallow water region, said shallow water region having a depth less than 30 meters, a first location being located at a shore, and a second location remote from the first location; wherein said wind power generator has a base provided with a central hole and a first connecting portion located at a top end of the base, a connecting member provided with a second connecting portion located at a bottom end and a first joint portion located at a top end of the member, a tower provided with a second joint portion located at a bottom end of the tower, a nacelle, and a blade wheel; said method comprising:

stage (A): positioning the base at the first location and inserting said tower directly through said central hole, fixing the nacelle on said tower, and then fixing said blade wheel to said nacelle so as to form a prefabricated wind power generator;

stage (B): lifting said prefabricated wind power generator with a ship and carrying the prefabricated wind power generator to a second location; and stage (C): installing the prefabricated wind power generator by ballasting said ship to the seabed, descending the base to said second location, lifting said tower out of the central hole of said base, bolting the second connecting portion of the connecting member to said first connecting portion of the base, and bolting said second joint portion of the tower to said first joint portion of the connecting member.

2. A method of installing a wind power generator at a shallow water region, said shallow water region having a depth less than 30 meters, a first location being located at a shore, and a second location remote from the first location; wherein said wind power generator has a base provided with a central hole and a first connecting portion located at a top end of the base, a connecting member provided with a second connecting portion located at a bottom end and a first joint portion located at a top end of the member, wherein said connecting member is further provided with a positioning bar to correspondingly extend into a positioning hole further provided in said tower, a tower provided with a second joint portion located at a bottom end of the tower, a plurality of buffers to be deposited between said first joint portion and said second joint portion, a nacelle, and a blade wheel; said method comprising:

stage (A): positioning the base at the first location and inserting said tower directly through said central hole, fixing the nacelle on said tower, and then fixing said blade wheel to said nacelle so as to form a prefabricated wind power generator;

stage (B): lifting said prefabricated wind power generator with a ship and carrying the prefabricated wind power generator to a second location; and stage (C): installing the prefabricated wind power generator by ballasting said ship to the seabed, descending the base to said second location, lifting said tower out of the central hole of said base, bolting the second connecting portion of the connecting member to said first connecting portion of the base, depositing said buffers on said first joint portion of the connecting portion, and lowering said second joint portion of the tower to press on said buffers with the positioning bar of said connecting member inserted into said positioning hole of said tower, enabling said second joint portion to slowly approach said first joint portion.

* * * * *